United States Patent [19]

Kirstein

[11] Patent Number: 4,814,990
[45] Date of Patent: Mar. 21, 1989

[54] CONTROL CIRCUIT FOR MOTOR VEHICLES

[75] Inventor: Gerhard Kirstein, Augsburg, Fed. Rep. of Germany

[73] Assignee: Zahnraderfabrik Renk AG, Fed. Rep. of Germany

[21] Appl. No.: 838,794

[22] Filed: Mar. 12, 1986

[30] Foreign Application Priority Data

Mar. 13, 1985 [DE] Fed. Rep. of Germany ....... 3508879

[51] Int. Cl.⁴ ............................................... B60T 8/32
[52] U.S. Cl. .................................. 364/426.03; 303/92
[58] Field of Search ................ 364/426, 565; 180/197; 361/238; 303/95, 96, 93, 92

[56] References Cited

U.S. PATENT DOCUMENTS 4,480,309 10/1984 Burckhardt et al. ................ 364/426
4,484,280 11/1984 Brugger et al. .................... 364/426
4,521,856 6/1985 Phelps et al. ........................ 364/426
4,583,611 4/1986 Frank et al. ......................... 364/426

Primary Examiner—Gary Chin
Attorney, Agent, or Firm—Larson and Taylor

[57] ABSTRACT

A control circuit for motor vehicles serves to prevent an undesirable spinning of a driven vehicle wheel. The following components are provided for this purpose: a first angular speed transmitter to detect the speed of at least one non-driven vehicle wheel, a second angular speed transmitter to detect the speed of at least one driven vehicle wheel, a microcomputer connected via subcircuits to the two angular speed transmitters, and an actuating device to actuate at least one clutch or brake in the gear train between the vehicle engine and the driven vehicle wheel or wheels which is controlled by the microcomputer as a function of the differential between the speeds detected at any time by the two angular speed transmitters.

4 Claims, 1 Drawing Sheet

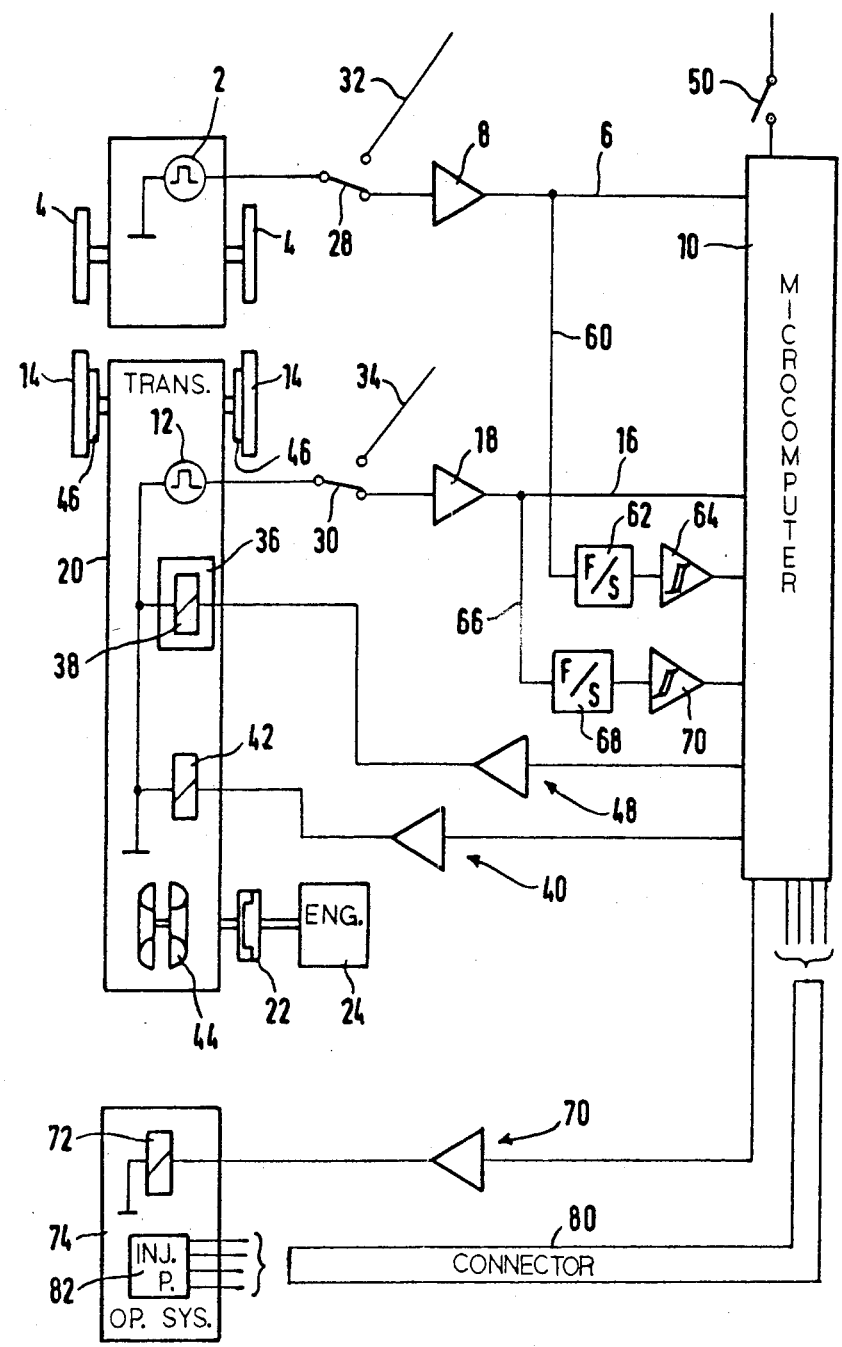

4,814,990

CONTROL CIRCUIT FOR MOTOR VEHICLES

FIELD OF THE INVENTION

The invention relates to a control circuit for motor vehicles for the purpose of preventing undesirable spinning by a driven vehicle wheel.

SUMMARY OF THE INVENTION

The object of the invention is to solve the problem of preventing undesirable spinning by the driven vehicle wheel or wheels.

This problem is solved by the invention by means of: (a) a first angular speed detector to detect the speed of revolution of at least one non-driven vehicle wheel, (b) a second angular speed detector to detect the speed of revolution of at least one driven vehicle wheel, (c) a microcomputer connected to the two speed detectors via a subcircuit, and (d) an actuating device for the control of at least one clutch or brake in the gear train between the vehicle engine and the driven vehicle wheel or wheels which is controlled by the microcomputer as a function of the difference between the speeds of revolution detected by the two angular speed detectors.

The control circuit can be adjusted to various control modes whereby either the spinning of the driven wheel or wheels is prevented entirely or the spinning of the driven wheel or wheels is permitted up to a predetermined difference between the speed of a non-driven vehicle wheel and the speed of the driven wheel or wheels.

The angular speed detectors may detect the speed either directly at the wheels or at the wheel shafts or at drive gears connected to the wheels.

The invention prevents the driven wheel or wheels from spinning in an undesirable manner, particularly when the vehicle starts to move.

A further characteristic of the invention is that a secondary control circuit branches off from the subcircuit of the first angular speed detector. This secondary circuit is also connected to the microcomputer and contains a frequency-voltage transformer as well as a Schmitt trigger circuit in order to generate a binary status signal for the microcomputer.

A further characteristic of the invention is that a secondary control circuit branches off from the subcircuit of the second angular speed detector. This secondary circuit is also connected to the microcomputer and contains a frequency-voltage transformer as well as a Schmitt trigger circuit in order to generate a binary status signal for the microcomputer.

In a preferred embodiment of the invention, a switch is provided with which the control circuit can be switched on and off. This switch is preferably located near the driver's seat in the cabin of the vehicle, so that the driver can switch the control circuit on or off at will.

The objects and purposes of the present invention will be apparent from the detailed description to follow.

BRIEF DESCRIPTION OF THE DRAWINGS

The invention is described below on the basis of one embodiment with particular reference to the drawings, which illustrates schematically a control circuit in accordance with a preferred embodiment of the invention.

DETAILED DESCRIPTION OF THE PREFERRED EMBODIMENTS

In the control circuit of the invention shown by the drawing, an angular speed detector 2, hereinafter referred to as the first angular speed detector 2, for a non-driven vehicle wheel 4, is connected to a microcomputer 10 via a subcircuit 6 that includes an amplifier 8.

An angular speed detector 12, hereinafter referred to as the second angular detector 12, for a driven vehicle wheel 14 is also connected to microcomputer 10 via a subcircuit 16 that includes an amplifier 18. Second angular speed detector 12 does not detect the speed of vehicle wheel 12 directly, but rather a speed proportional to the speed at the vehicle's transmission 20. Transmission 20 is connected to an engine 24 via a clutch 22. Subcircuit 6 contains a selector switch 28 and subcircuit 16 contains a selector switch 30 by means of which switches the two angular speed detectors 2 and 12 are connected selectively to test circuits 32 or 34 which check the performance of the angular speed detectors.

Microcomputer 10 determines the difference between the signals generated by the two angular speed detectors 2 and 12 which signals are a function of non-driven wheel 4 and of driven wheel 14, respectively. An actuating device 36 operated by an electromagnetic pressure adjustment device 38 actuates the operating pressure of clutch 22 as a function of the speed differential. This takes place in correlation with the adjustment by microcomputer 10 such that the operating pressure of clutch 22 is reduced in the event of spinning by driven wheel or wheels 14 to such an extent that the clutch operates with slippage or opens up completely in order to prevent the wheels 14 from spinning. The preferred adjustment of microcomputer 10 is such that the driven wheels 14 can spin with minimum relative speed and that clutch 22 will open partially or open up completely only when the value is exceeded. Microcomputer 10 also actuates the switching magnets 42 of transmission 20 via the control circuit 40 which includes an amplifier as shown.

In one embodiment where transmission 20 is an automatic transmission with a torque converter 44, clutch 22 can normally be dispensed with and, in lieu of clutch 22, actuating device 36 controls in similar manner the brakes 46 of driven wheels 14.

Actuating device 36 preferably receives from microcomputer 10 (via a control circuit 48 which includes an amplifier as shown) pulse signals whose signal width is a function of the levels of speed measured by the two angular speed transmitters 2 and 12.

The control circuit can be switched off completely by means of a switch 50. Switch 50 is preferably located in the cabin near the driver of the vehicle concerned. It is thus possible to drive the vehicle in known fashion with wheels that are free to spin at will.

From subcircuit 6 of first angular speed detector 2, a secondary control circuit 60 branches off which is also connected to microcomputer 10 and contains a frequency-voltage transformer 62 as well as a Schmitt trigger circuit 64. This secondary control circuit indicates to microcomputer 10 by means of a binary signal whether the non-driven wheels 4 are turning or not.

Subcircuit 16 of second angular speed detector 12 is also connected to microcomputer 10 via a secondary control circuit 66. Secondary control circuit 66 contains a frequency-voltage transformer 68 and a Schmitt circuit 70 through which the microcomputer is informed at any given time by means of a binary (yes/no) signal whether the driven wheels 14 are turning or not.

The two secondary control circuits 60 and 66 always relay to microcomputer 10 by "yes" or "no" whether or no the wheels 4 and 14 are turning. When, in the event of a fault in the control circuit, a speed differential is measured via the subcircuits 6 and 16 despite the fact that the secondary control circuits 60 and 66 indicate that the wheels 4 and 14 are not turning at all, microcomputer 10 recognizes this as a malfunction.

Microcomputer 10 can control via subcircuit 70 including an amplifier as shown a throttle 72 for the vehicle's engine 24 that actuates the vehicle's transmission 20. Throttle 72 can be mounted either in an air intake pipe of engine 24 or in its exhaust system.

Microcomputer 10 can also control via a connector subcircuit 80 an electronically operated injection pump 82 for engine 24. The throttle 72 and injection pump 82 are parts of the operating system 74 of the engine 24.

Although the invention has been described in considerable detail with respect to a preferred embodiment thereof, it will be apparent that numerous modifications and variations are possible, all within the spirit and scope of the invention.

I claim:

1. A control circuit for a motor vehicle having at least one driven wheel driven by an engine and at least one non-driven wheel, said control circuit preventing undesirable spinning of the driven wheel, comprising:
    (a) a first angular speed detector means for detecting the speed of revolution of at least one-driven vehicle wheel,
    (b) a second angular speed detector means for detecting the speed of revolution of at least one driven vehicle wheel,
    (c) a microcomputer connected to the two speed detector means via respective interfacing subcircuits,
    (d) an actuating means for controlling the rate of rotation by the vehicle engine of the driven vehicle wheel being detected, the actuating means being controlled by the microcomputer as a function of the speed differential between the speeds of revolution detected by the two angular speed detector means so as to prevent undesirable spinning of the driven wheel being detected,
    (e) a first secondary control circuit which branches off from the interfacing subcircuit of the first angular speed detector means, said secondary circuit being also connected to the microcomputer and containing a frequency-voltage transformer connected to a Schmitt trigger circuit for the generation of a binary status signal for the microcomputer indicative of the rotation or non-rotation of the non-driven wheel,
    (f) a second secondary control circuit which branches off from the interfacing subcircuit of the second angular speed detector means, said second secondary circuit being also connected to the microcomputer and containing a second frequency-voltage transformer connected to a second Schmitt trigger circuit for the generation of a binary status signal for the microcomputer indicative of the rotation of non-rotation of the driven wheel, and
    wherein the microcomputer recognizes a malfunction of said control circuit when the speed differential is determined by said microcomputer and said first secondary circuit and said second secondary circuit both generate respective binary signals indicating that both the non-driven wheel and the driven wheel are not rotating.

2. A control circuit in accordance with claim 1, and further including an operator controlled switch connected to said microcomputer by which the control circuit is turned on or off at will.

3. A control circuit in accordance with claim 1, and further including a subcircuit means for controlling the engine of the motor vehicle by the microcomputer.

4. A control circuit in accordance with claim 3, wherein the subcircuit means is connected to an electronically controlled injection pump for the engine to control the speed of the engine.

* * * * *